United States Patent [19]

Bolger

[11] Patent Number: 4,538,178
[45] Date of Patent: Aug. 27, 1985

[54] DIGITAL SIGNAL PEAKING APPARATUS WITH CONTROLLABLE PEAKING LEVEL

[75] Inventor: Thomas V. Bolger, Merchantville, N.J.

[73] Assignee: RCA Corporation, Princeton, N.J.

[21] Appl. No.: 507,554

[22] Filed: Jun. 24, 1983

[51] Int. Cl.³ .............................................. H04N 5/14
[52] U.S. Cl. ..................................... 358/166; 358/37; 358/39
[58] Field of Search ................ 358/166, 167, 160, 36, 358/37, 39, 315, 316, 318; 364/574, 575, 571, 732, 734; 307/231, 350

[56] References Cited

U.S. PATENT DOCUMENTS

| | | | |
|---|---|---|---|
| 3,333,055 | 7/1967 | Krause | 178/6 |
| 3,602,737 | 8/1971 | Radecke | 307/231 |
| 3,715,477 | 2/1973 | Olsen et al. | 178/5.4 R |
| 3,979,683 | 9/1976 | Ikeda | 328/165 |
| 4,009,334 | 2/1977 | Sypula | 358/178 |
| 4,167,749 | 9/1979 | Burrus | 358/8 |
| 4,268,864 | 5/1981 | Green | 358/166 |
| 4,437,123 | 3/1984 | Harlan | 358/166 |
| 4,437,124 | 3/1984 | Cochran | 358/166 |

FOREIGN PATENT DOCUMENTS 2059203A 4/1981 United Kingdom .

OTHER PUBLICATIONS

J. Rossi, "Digital Television Image Enhancement", *SMPTE Journal*, vol. 84, Jul. 1975, pp. 545-551.
J. Rossi, "Digital Techniques for Reducing Television Noise", *SMPTE Journal*, vol. 87, Mar. 1978, pp. 134-140.

*Primary Examiner*—Tommy P. Chin
*Attorney, Agent, or Firm*—E. M. Whitacre; P. J. Rasmussen; C. A. Berard, Jr.

[57] ABSTRACT

A digital signal peaking apparatus combines input digital signals with filtered and scaled representations thereof to produce controllably peaked digital signals. A digital filter produces the relatively higher frequency components of the input digital signals which are controllably scaled by a digital multiplier in accordance with a multiplier coefficient. A control arrangement develops the multiplier coefficient having a value determined in accordance with the peak magnitude of the higher frequency components of the input digital signals relative to the value of a peaking control level signal.

19 Claims, 10 Drawing Figures

DIGITAL SIGNAL PEAKING APPARATUS WITH CONTROLLABLE PEAKING LEVEL

The present invention relates to digital signal processing apparatus and, in particular, to a digital signal peaking apparatus providing peaking controllable in response to at least a portion of the digital signal to be peaked. The present invention is useful in processing digital television signals in a television receiver.

Peaking is a signal processing operation in which higher frequency signal components are emphasized or deemphasized so as to adjust the overall signal frequency spectrum. It is useful where the higher frequency signal components have been undesirably attenuated by prior signal processing operations or apparatus. For television (TV) signals, for example, attenuation of higher frequency luminance signals causes undesirable loss of horizontal details in the reproduced picture. Such attenuation can be introduced by the RF tuner and amplifiers, the IF amplifiers or by the apparatus separating luminance and chrominance signal components. Fixed peaking arrangements are inadequate in a TV receiver because they cannot respond to changes in the received signals or the receiver performance and cannot be adjusted to suit viewer preference (which not only differs among viewers but which can differ for any one viewer in accordance with the program content).

Thus, it is desirable to provide a controllable peaking arrangement which can adjust the degree to which signals are peaked in response to a viewer-controllable setting and in response to changes in the condition of the signals being processed. When such peaking arrangements are employed in TV receivers, they tend to enhance the horizontal detail content of the reproduced pictures. Analog circuit arrangements providing such characteristics for TV receivers having analog signal processing are described in U.S. Pat. No. 4,437,123 entitled DYNAMICALLY CONTROLLED HORIZONTAL PEAKING SYSTEM filed on Apr. 30, 1982 by W. E. Harlan and U.S. Pat. No. 4,509,080 entitled VIDEO SIGNAL PEAKING SYSTEM filed on July 2, 1982 by W. A. Lagoni and W. E. Harlan, which are assigned to the same assignee as is the present invention.

In digital signal processing apparatus, however, a digital signal peaking apparatus must perform the peaking operation on signals which are digital numbers representing signal levels rather than directly upon the signal levels per se. Thus, digital circuitry must be employed to generate a peak-level representative digital signal, to develop a multiplier coefficient signal therefrom under certain digital signal conditions, and to develop peaked digital signals in response to the multiplier coefficient signal.

The analog peaking systems described in the patent applications referred to above employ a feedback arrangement including a bandpass filter for controlling the peaking level. In digital signal peaking apparatus, however, the ability to scale digital signals with predictability and accuracy permits avoidance of a feedback arrangement and the complexity associated therewith. Further, the band pass filter just referred to is eliminated.

Accordingly, the digital signal processing apparatus of the present invention comprises a digital filter producing certain frequency components of input digital signals which are scaled by a scaling device in accordance with a scaling signal and are combined with the input digital signals. A control arrangement develops the scaling signal in accordance with the certain frequency components of the input digital signals and applies the scaling signal to the scaling device.

Figure 1:
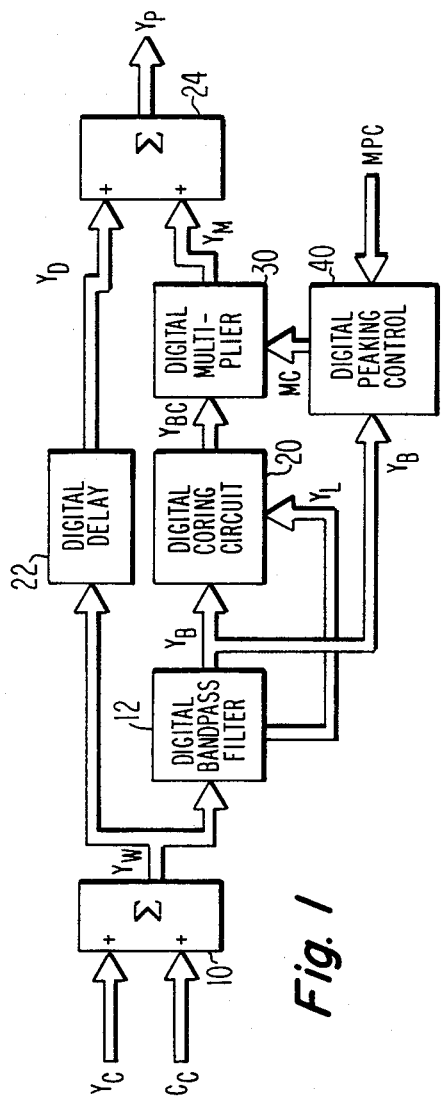
FIG. 1 is a schematic diagram in block diagram form of digital signal processing apparatus including an exemplary embodiment of the present invention.

In the drawings, broad arrows represent signal paths for multiple-bit parallel digital signals and line arrows represent signal paths for single-bit or serial digital signals, for clock signals or for control signals. A circle at the input to a logic element indicates that such element is responsive to the inverse of the signal applied to such input.

FIG. 1 illustrates a portion of a digital signal processing section of a TV receiver in which luminance signals are processed digitally. Although the present invention is one of general applicability, it is described herein in the environment of a digital luminance signal processor section of a TV receiver because the digital peaking operation controllable in response to adjustable digital peaking signals is advantageously practiced therein.

Figure 2:
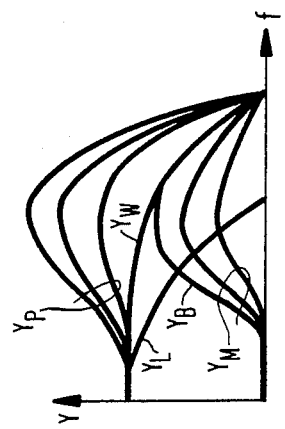
FIGS. 2, 4 and 5 are graphs of transfer characteristics useful in understanding the apparatus of FIG. 1.

Digital adder 10 is a source of wideband digital luminance signals $Y_W$ which it develops by adding vertical detail information included in comb-filtered digital chrominance signals $C_C$ to comb-filtered digital luminance signals $Y_C$. The magnitude of digital luminance signals Y as a function of frequency f is illustrated in FIG. 2, in which the wideband digital luminance signal $Y_W$ is correspondingly identified.

Digital filter 12 of FIG. 1 receives wideband digital luminance signals $Y_W$ and develops low-pass filtered digital luminance signals $Y_L$ including the relatively lower frequency components of signals $Y_W$ and develops band-pass filtered digital luminance signals $Y_B$ including the relatively higher frequency components thereof. Filtered digital luminance signals $Y_L$ and $Y_B$ are preferably substantially complementary in frequency spectrum magnitude as illustrated by curves $Y_L$ and $Y_B$ of FIG. 2.

Figure 3:
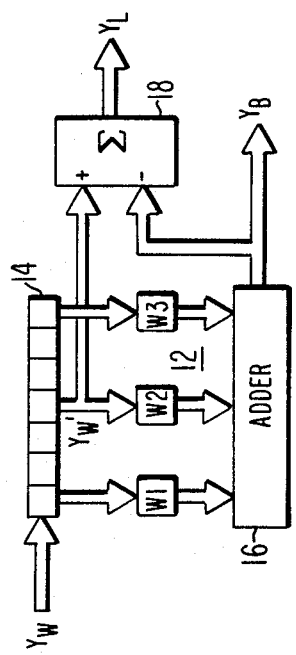
FIGS. 3, 6, 7, 8, 9 and 10 are schematic diagrams, at least partially in block diagram form, of exemplary embodiments of portions of the apparatus of FIG. 1.

An exemplary embodiment of digital filter 12 shown in FIG. 3 includes plural-stage shift register 14 which produces delayed replicas of wideband digital luminance signals $Y_W$ at its various output taps in response to input signals $Y_W$ and a clocking signal (not shown). The delayed digital luminance signals produced at the taps of shift register 14 are weighted by digital weighting circuits W1, W2 and W3 which are, for example, digital multipliers. The values of the weighting coefficients of weighting circuits W1, W2 and W3 determine the frequency response of digital filter 12 as is known to those skilled in the art.

Digital adder 16 sums the weighted delayed luminance signals to develop band-pass filtered digital luminance signals $Y_B$. An output tap at the central stage of shift register 14 produces delayed wideband digital luminance signals $Y_W'$ from which band-pass filtered digital luminance signals $Y_B$ are subtracted by subtractor 18 to develop low-pass filtered digital luminance signals $Y_L$. In this manner, signals $Y_B$ and $Y_L$ are substantially complementary.

Digital coring circuit 20 of FIG. 1 develops cored digital luminance signals $Y_{BC}$ which are, for example, controllably cored in response to low-pass filtered digital luminance signals $Y_L$. When the levels of digital luminance signals $Y_L$ are relatively high, corresponding to a bright picture, coring circuit 20 exhibits a coring threshold $Y_{TL}$ of relative low value to produce cored signals $Y_{BC}$ only when the magnitude of $Y_B$ exceeds that of $Y_{TL}$. When the levels of digital luminance signals $Y_L$ are relatively low, corresponding to a dark picture, digital coring circuit 20 exhibits a coring threshold level $Y_{TH}$ of relatively higher value to produce cored signals $Y_{BC}$ only when the magnitude of $Y_B$ exceeds that of $Y_{TH}$.

Coring circuit 20 thereby cores more deeply for darker scenes than for lighter scenes. This is desirable because the relatively low level, higher frequency signals it removes, which are often associated with undesirable noise signals, tend to produce easily perceived objectionable light specks in the darker scenes. Reference is made to U.S. patent application Ser. No. 507,555 entitled DIGITAL SIGNAL CORING APPARATUS WITH CONTROLLABLE CORING THRESHOLD LEVEL filed on even date herewith wherein coring circuit 20 is further described.

Digital multiplier 30 controllably scales the cored digital luminance signals $Y_{BC}$ received from coring circuit 20. This scaling is controlled in response to multiplier coefficient MC developed by digital peaking control 40 whereby multiplier 30 develops multiplied digital luminance signals $Y_M$ having the characteristics shown in FIG. 2 by the family of curves labelled $Y_M$. Multiplier 30 is, for example, an eight-by-eight bit multiplier but can be a relatively simple shift and add multiplier where a relatively few values of multiplier coefficient MC will suffice.

Digital peaking control 40 develops multiplier coefficient MC controllably in response to bandpass filtered digital luminance signals $Y_B$ and a viewer-adjustable manual peaking control signal MPC. MC is controlled responsive to the peak magnitudes $Y_{BPK}$ of the bandpass filtered luminance signals $Y_B$ relative to the magnitude of control signal MPC in accordance with a predetermined charcteristic, for example, that shown in FIG. 4. When the peak magnitude $Y_{BPK}$ is less than MPC, indicating relatively lesser high-frequency luminance content, a value of MC equal to one, represented by line 60, is developed to introduce maximum peaking, i.e. maximum emphasis of whatever high-frequency signal content is present. When the peak magnitude $Y_{BPK}$ is greater than twice MPC, indicating relatively greater high-frequency luminance content, a value of MC equal to one, represented by line 64, is developed to introduce substantially no peaking, i.e. no emphasis of high-frequency signal content. In between those levels of $Y_{BPK}$, MC is controlled between unity and zero, represented by line 62, in accordance with the ratio $Y_{BPK}/MPC$. It is noted that line 62 is in practice a staircase-like characteristic in which the number of steps is determined by the number of digital levels which MC can take, which number is limited by the number of bits of digital signal MC.

Wideband digital luminance signals $Y_W$ are delayed in time by digital delay circuit 22 which develops delayed digital luminance signals $Y_D$. Delay circuit 22 is, for example, a shift register having a number of stages selected to provide a time delay substantially equal to that occurring in the development of multiplied digital luminance signals $Y_M$ in response to wideband digital luminance signals $Y_W$ via the signal path 12, 20, 30.

Digital adder 24 combines delayed wideband digital luminance signals $Y_D$ and multiplied, controllably cored digital luminance signals $Y_M$ to develop peaked luminance signals $Y_P$. FIG. 2 further illustrates a family of magnitude vs. frequency characteristics of peaked digital luminance signals $Y_P$ which are the sums of respective ones of the family of characteristics $Y_M$ and the characteristic of $Y_W$ (which is representative of $Y_D$). The overall transfer function of the peaking circuit of FIG. 1 can be expressed as $$Y_P = [1 + H(12) \cdot H(20) \cdot MC] Y_W \quad (1)$$

where: H(12) is the transfer function of digital filter 12, H(20) is the transfer function of coring circuit 20, and where the delay 22 is selected as described above. If consideration is limited to that portion $Y'_B$ of digital luminance signals $Y_W$ which are within the passband of digital filter 12 (i.e., so that $|H(12)| \simeq 1$) and if the coring threshold level of coring circuit 20 is sufficiently low as to be insignificant (i.e., so that $|H(20)| \simeq 1$), then the transfer function becomes $$Y'_P = [1 + MC] Y'_B. \quad (2)$$

Since MC ranges, for example, between zero and unity, $Y'_P$ will range between one and two times $Y'_B$.

Figure 4:
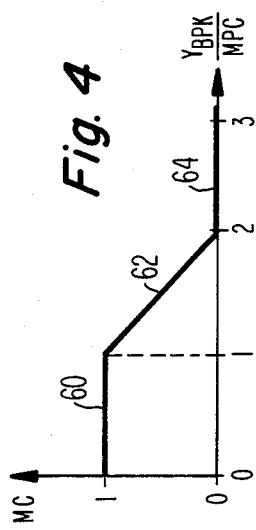
Figure 5:
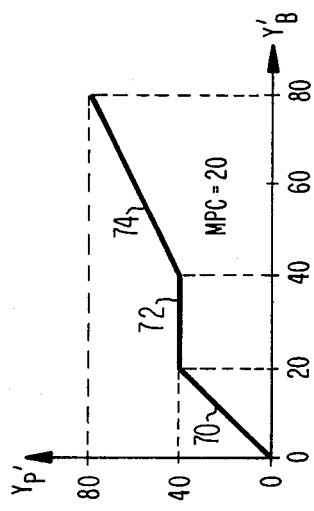

Consider, for example, that digital luminance signals $Y'_B$ have digital values equivalent to decimal numbers between zero and about eighty as shown in FIG. 5 and that the manual peaking control MPC is set to a level equivalent to the decimal number twenty. For values of $Y'_B < 20$, peaking control 40 develops MC=1 in accordance with line 60 of FIG. 4 and $Y'_P = 2Y'_B$ in accordance with equation (2). This range is illustrated as line 70 of FIG. 5. As the value of $Y'_B$ increases towards forty, peaking control 40 reduces the peaking in accordance with line 62 of FIG. 4 so that $Y'_P$ is developed having values as illustrated by line 72 of FIG. 5. For values of $Y'_B > 40$, control 40 develops MC=0 in accordance with line 64 of FIG. 4 so that $Y'_P$ is developed having values as illustrated by line 74 of FIG. 5.

Figure 6:
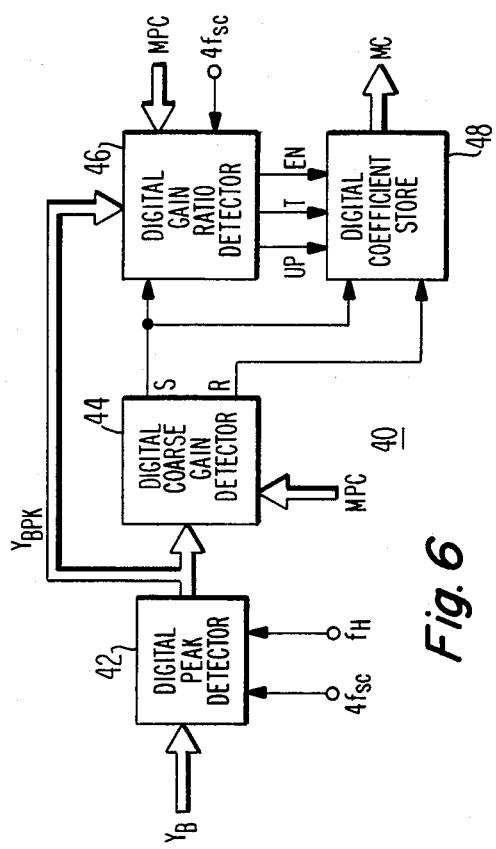

FIG. 6 shows an exemplary embodiment of digital peaking control 40 which develops the multiplier coefficient MC having the characteristic 60-62-64 described above in relation to FIGS. 1 and 4. Digital peak detector 42 detects the peak magnitude $Y_{BPK}$ of the bandpass filtered digital luminance signal $Y_B$. Digital coarse gain detector 44 responds to $Y_{BPK}$ and MPC to cause digital coefficient store 48 to produce multiplier coefficients MC corresponding to constant value portions 60 and 64 of FIG. 4. Digital gain ratio detector 46 responds to $Y_{BPK}$ and MPC to cause digital coefficient store 48 to produce multiplier coefficients MC corresponding to sloped portion 62 of FIG. 4. Detectors 42, 44, 46 and store 48 are described in detail below in relation to FIGS. 7-10.

Figure 7:
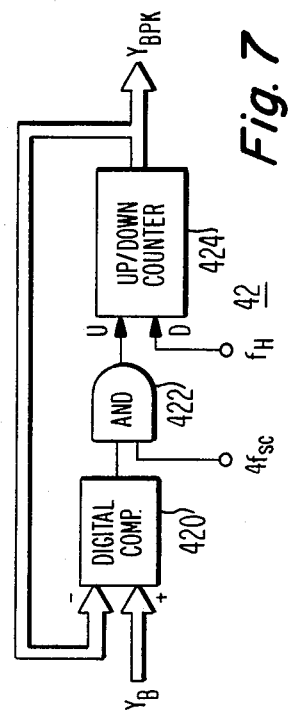

FIG. 7 shows an exemplary embodiment of digital peak detector 42 in which the detected magnitude $Y_{BPK}$ is represented by the count stored in up-down counter 424. Digital comparator 420 produces an output which enables AND gate 422 for the condition that the magnitude of the bandpass filtered digital luminance signal $Y_B$ exceeds the magnitude of $Y_{BPK}$; otherwise comparator 420 produces an output which disables AND gate 422. Enabling AND gate 422 causes clock signal $4f_{sc}$ to be applied to the count-up input U of counter 424 to increment the count therein. Clock signal $4f_{sc}$ has a relatively high frequency, e.g., four times that of the color subcarrier signal $f_{sc}$, so that counter 424 increments at a relatively rapid rate. Clock signal $f_H$ is applied to the count-down input D of counter 424 to decrement the count therein. Clock signal $f_H$ has a relatively low frequency, e.g., that of the TV horizontal synchronizing pulses, so that counter 424 decrements at a relatively low rate. Thus, peak detector 40 produces peak magnitude signal $Y_{BPK}$ which can increase rapidly but which decreases slowly thereby to represent the peak magnitude of luminance signals $Y_B$.

Figure 8:
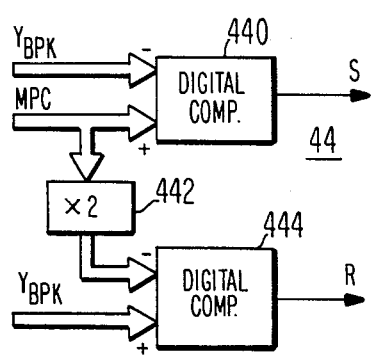

FIG. 8 shows an exemplary embodiment of digital coarse gain detector 44 which cooperates with digital coefficient store 48 to develop the zero and unity values of multiplier coefficient MC corresponding to portions 64 and 60, respectively, of FIG. 4. Digital comparator 440 receives the peak magnitude signal $Y_{BPK}$ and the manual peaking control magnitude MPC to develop signal S when MPC exceeds $Y_{BPK}$; i.e., for the condition ($Y_{BPK}$/MPC)<1. Production of signal S indicates that MC=1 is required.

Digital scaling device 442 increases the magnitude of MPC by a factor of two and applies the result to digital comparator 444. Comparator 444 receives the resulting signal 2·MPC and peak magnitude signal $Y_{BPK}$ to develop signal R when $Y_{BPK}$ exceeds two times MPC, i.e. for the condition ($Y_{BPK}$/MPC)>2. Production of signal R indicates that MC=0 is required. Neither of signals R and S are developed for the condition 2>($Y_{BPK}$/MPC)>1 for which a value of MC between zero and unity is required.

Figure 9:
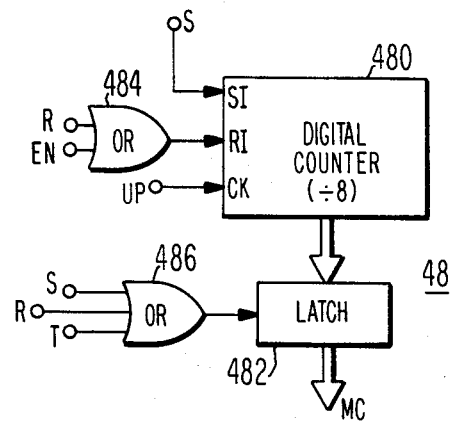

FIG. 9 shows an exemplary embodiment of digital coefficient store 48 which develops multiplier coefficient MC. Divide-by-eight digital counter 480 develops and stores the count which is to become MC upon its being transferred to and stored in digital latch register 482. Application of setting signal S from detector 44 develops MC=1 as follows. Signal S is applied to the set input SI of counter 480 to initialize and hold the count stored therein to its maximum value, i.e. all bits are ones. Signal S is also applied via OR gate 486 to latch 482 to store the all-ones count from counter 480 therein thereby producing MC=1.

Application of resetting signal R from detector 44 develops MC=0 as follows. Signal R is applied via OR gate 484 to the reset input RI of counter 480 to initialize and hold the count stored therein to its minimum value, i.e. all bits are zeros. Signal R is also applied via OR gate 486 to latch 482 to store the all-zeros count from counter 480 therein thereby producing MC=0. The functions of signals EN, UP and T with respect to store 48 are described below in relation to detector 46. Thus, detectors 42, 44 and store 48 cooperate to develop two fixed values of MC corresponding to two non-overlapping ranges of the ratio $Y_{BPK}$/MPC.

Figure 10:
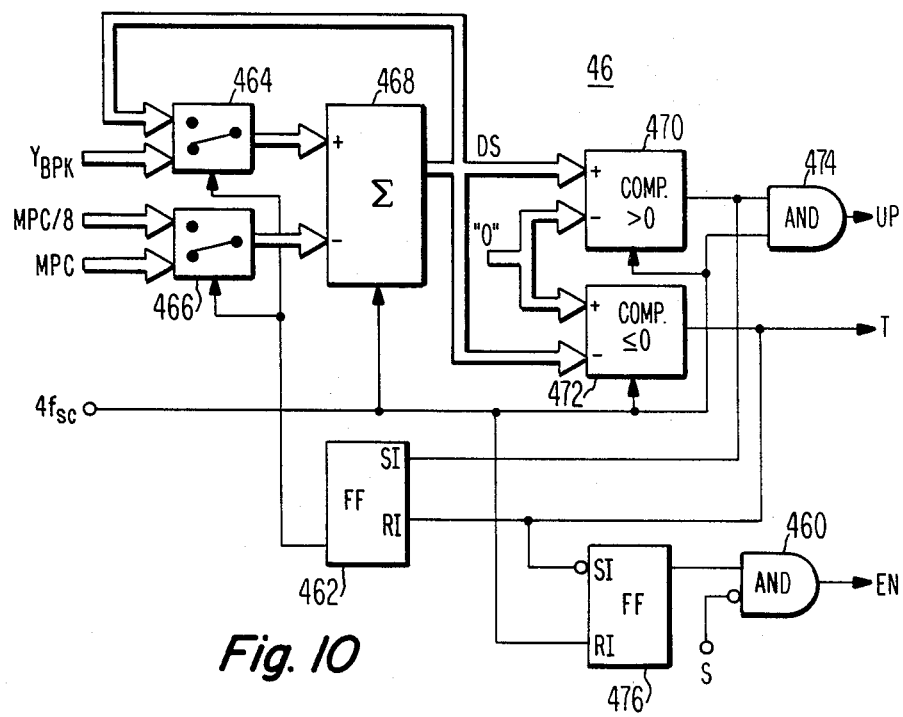

FIG. 10 shows an exemplary embodiment of digital gain ratio detector 46 which cooperates with store 48 to develop values of MC between zero and one. Assume that the condition 2>($Y_{BPK-MPC}$)>1 is satisfied and that a signal is applied to the reset input RI of flip flop 462 which is reset thereby to develop an output signal to control switches 464 and 466 to be in the positions illustrated. Thus, switch 464 applies signal $Y_{BPK}$ to digital subtractor 468 and switch 466 applies signal MPC thereto. Subtractor 468 produces the difference signal DS having a magnitude DS=($Y_{BPK}$−MPC) at its output, which signal is latched thereat in response to clock signal $4f_{sc}$.

30 Since the condition 2>($Y_{BPK}$/MPC)>1 is satisfied, the difference signal DS is greater than zero causing an output signal to be developed by digital comparator 470, i.e. the condition ($Y_{BPK}$−MPC)>0 is satisfied. The output signal from comparator 470 is applied to enable AND gate 474 to pass clock signal $4f_{sc}$ to produce an output pulse UP. The output signal from comparator 470 is applied to the set input SI of flip-flop 462 which is set thereby to cause switches 464 and 466 to transfer so that the difference signal DS from the output of subtractor 468 is applied to one of its inputs and the increment level signal MPC/8 is applied to the other input thereof. The level MPC/8 is the manual peaking control level MPC divided by eight, which division is readily accomplished by shifting connections of the bits of MPC to bit positions of MPC/8 having lower bit weights.

Subtractor 468 now produces the difference signal DS having the value DS=[($Y_{BPK}$−MPC) −(MPC/8)] which, if greater than zero, causes comparator 470 to continue to enable AND gate 474 thereby to produce a second output pulse UP. The sequence of subtracting MPC/8 from the most recent difference signal DS and generating a pulse UP repeats until the new difference signal DS becomes less than or equal to zero. Digital comparator 472 produces an output signal when difference signal DS is less than or equal to zero, which output signal is supplied as terminate/transfer signal T. Signal T is applied to reset flip-flop 462 thereby reversing switches 464 and 466 so that detector 46 repeats the sequence just described.

Terminate/transfer signal T becomes low at the beginning of the sequence of detector 46 only if comparator 472 is not detecting, i.e. only if intermediate values of MC are to be developed. It is noted that signal S is low so to enable AND gate 460. Signal T becoming low is applied in inverted sense to set input SI of flip-flop 476 which is set thereby to produce an output signal to establish coincidence at AND gate 460 which develops enable signal EN. Clock signal 4fsc is applied to reset input RI of flip-flop 476 which is reset thereby to terminate signal EN which is, therefore, a momentarily high signal. As described below, signal EN resets coefficient store 48 in preparation for counting the value of MC.

Coefficient store 48 of FIG. 9 develops MC in response to operation of gain ratio detector 46 as follows. Momentary enabling signal EN is applied via OR gate 484 to reset input RI to reset counter 480 to an initial all-zeros count. Thereafter UP signals from detector 46 are applied to the clock input CK of counter 480 to increment the count stored therein by one count for each occurrence of the UP signal thereby to count to the required value of multiplier coefficient MC. Signal T developed by detector 46 at the termination of its sequence of comparing is applied via OR gate 486 to transfer and store the count stored in counter 480 to latch 482 as the multiplier coefficient MC. Thus detectors 42, 44, 46 and store 48 cooperate to develop intermediate values of MC in accordance with an intermediate range of values of the ratio $Y_{BPK}$/MPC.

Modifications are contemplated to the present invention within the scope of the claims following. For example, arrangements providing "depeaking" of $Y_W$ may be desired. Depeaking refers to the situation where ones of the family of curves $Y_P$ of FIG. 2 are below the curve of $Y_W$. In the arrangement of FIG. 1, depeaking is provided by negative values of MC developed by peaking control 40 for certain values of manual peaking level MPC. For that provision, counter 480 is an up-down counter enabled to count down for the certain values of MPC. Depeaking is also provided if the arrangement of FIG. 1 is modified so that low-pass filtered digital luminance signals $Y_L$ are applied to delay 22 in place of signals $Y_W$ in which case only positive values of MC are required including values greater than unity. Alternatively, multiplier 30 can include scaling to provide multiplication by factors greater than unity such as by an upward shifting operation to provide factors $2^N$ where N is the number of upward shifts.

In addition, cored digital luminance signals $Y_{BC}$ can be applied to peaking control 40 in place of signals $Y_B$. Still further, numbers of intermediate values of MC other than the eight values described above can be developed by the embodiments of FIGS. 9 and 10 simply by changing counter 480 to a divide-by-N counter and correspondingly changing the MPC/8 input to switch 466 to the value MPC/N.

By way of further example, digital filter 12 can be a high-pass digital filter producing signals $Y_B$ since digital luminance signals $Y_W$ include frequency components within a limited range of frequencies. Still further, coring circuit 20 can be eliminated because its function is not necessary to the signal peaking operation. In addition, the time delay provided by delay 22 can be provided by the shift register 14 within filter 12 by utilizing the signals produced at a tap thereof having a suitably long delay as the delayed signals $Y_D$.

What is claimed is:

1. Digital signal processing apparatus comprising:
   a source for providing digital input signals to be processed;
   digital filtering means coupled to said source for developing filtered digital signals including relatively higher frequency components of said digital input signals;
   scaling means coupled to said digital filtering means for scaling the magnitudes of said filtered digital signals in accordance with a scaling signal to develop scaled digital signals;
   combining means, coupled to said source and to said scaling means, for combining said input digital signals and said scaled digital signals to produce processed digital signals; and
   control means coupled to said digital filtering means for developing said scaling signal in response to said filtered digital signals and coupled to said scaling means for applying said scaling signal thereto.

2. The apparatus of claim 1 wherein said control means comprises comparing means for developing said scaling signal in response to the relative magnitudes of said filtered digital signals and of a control level signal.

3. The apparatus of claim 2 wherein said control means further comprises means for developing signals representative of the peak magnitude of said filtered digital signals and for applying said peak-representative signals to said comparing means.

4. The apparatus of claim 2 wherein said comparing means comprises detecting means for developing said scaling signal having first and second predetermined values corresponding to first and second non-overlapping ranges of the ratio of the magnitude of said filtered digital signals to that of said control level signal.

5. The apparatus of claim 4 wherein said detecting means comprises a first comparator developing said first predetermined value scaling signal in response to said ratio not exceeding approximately unity, and a second comparator developing said second predetermined value scaling signal in response to said ratio exceeding a value substantially greater than unity.

6. The apparatus of claim 4 wherein said detecing means includes counting means for storing a count therein from which said scaling signal is developed, wheren said counting means is set to first and second predetermined counts corresponding to said first and second predetermined values, respectively.

7. The apparatus of claim 4 wherein said comparing means further comprises second detecting means for developing said scaling signal having values intermediate said first and second predetermined values in accordance with values of said ratio in a range intermediate said first and second ranges thereof.

8. The apparatus of claim 7 wherein said comparing means includes counting means for storing a count therein from which said scaling signal is developed, wherein said counting means is set by said detecting means to fiist and second predetermined counts corresponding to said first and second predetermined values, respectively, and is responsive to said second detecting means for storing counts intermediate said first and second predetermined values.

9. The apparatus of claim 1 further comprising digital coring means interposed between said digital filtering means and said scaling means for coring a range of magnitudes of said filtered digital signals coupled to said scaling means.

10. Digital signal processing apparatus comprising:
    a source for providing digital input signals to be processed;
    digital filtering means coupled to said source for developing filtered digital signals including relatively higher frequency components of said digital input signals;
    multiplying means coupled to said digital filtering means for controllably scaling the magnitudes of said filtered digital signals in accordance with the value of a multiplier coefficient to develop scaled digital signals;
    first detecting means coupled to said digital filtering means for developing a detected signal repres entative of the peak magnitude of said filtered digital signals;
    second detecting means coupled to said first detecting means for developing first signals indicating that said detected signal exceeds a range of values in a first sense and developing second signals indicating that said detected signals exceed said range of values in a second sense;
    control means coupled to said second detection means for developing said multiplier coefficient having first and second values in response to said first and second signals, respectively, and developing said multiplier coefficient having values intermediate said first and second values in response to said detected signal; and
    combining means coupled to said source and to said multiplying means for combining said digital input signals and said scaled digital signals to produce processed digital signals.

11. The apparatus of claim 10 wherein said control means includes counting means for storing a count therein from which said multiplier coefficient is developed, wherein said counting means is set to first and second predetermined counts corresponding to said first and second values, respectively, in response to said first and second signals, respectively.

12. The apparatus of claim 10 wherein said second detecting means includes:
   first comparator means for comparing said detecied signals to a first control level signal to develop said first signals, said first control level signal representing one boundary of said range of values, and
   second comparator means for comparing said detected signals to a second control level signal to develop said second signals, said second control level signal representing a second boundary of said range of value.

13. The apparatus of claim 12 wherein said control means includes counting means for storing a count therein from which said multiplier coefficient is developed, wherein said counting means is set to first and second predetermined counts corresponding to said first and second values, respectively, in response to said first and second signals, respectively.

14. The apparatus of claim 13 wherein said control means includes third detecting means for developing counting signals representative of the difference between the value of said detected signals and one of said first and second control level signals, and means for applying said counting signals to said counting means to change the count stored therein in accordance with said difference.

15. The apparatus of claim 12 including means for developing said second control level signal having a magnitude responsive to that of said first control level signal.

16. The apparatus of claim 10 wherein said control means includes counting means for storing a count therein from which said multiplier coefficient is developed, wherein said counting means is set by said first and second signals to first and second predetermined counts corresponding to said first and second values, respectively, and is responsive to said detected signal for storing counts intermediate said first and second predetermined counts.

17. The apparatus of claim 10 further comprising digital coring means interposed between said digital filtering means and said multiplying means for coring a range of magnitudes of said filtered signals coupled to said multiplying means.

18. A digital signal peaking system for controllably peaking relatively higher frequency signal components of digital input signals comprising:

a digital filter means to which said digital input signals are applied for producing filtered digital signals including said relatively higher frequency signal components;

peak detector means coupled to said digital filter means for developing a peak-level signal representative of the peak magnitude of said filtered digital signals;

digital counter means for producing a multiplier coefficient factor in accordance with a digital count stored therein;

first detector means, coupled to said peak detector means and to said digital counter means, for setting the stored digital count to a first predetermined value in response to said peak-level signal being greater than a first control value;

second detector means, coupled to said peak detector means and to said digital counter means, for setting the stored digital count to a second predetermined value in response to said peak level signal being less than a second control value;

third detector means, coupled to said peak detector means and to said digital counter means, for changing the stored digital count to a value intermediate said first and second predetermined values in accordance with the value of said peak-level signal intermediate said first and second control values;

digital multiplier means, coupled to said digital filter means and to said digital counter means, for scaling said filtered digital signals in accordance with said multiplier coefficient factor produced by said digital counter means;

delay means to which said digital input signals are applied for producing delayed digital signals in temporal alignment with corresponding scaled digital signals produced by said digital multiplier means; and digital combining means, coupled to said digital multiplier means and to said delay means, for combining said delayed digital signals and said scaled digital signals to develop peaked digital signals.

19. The peaking system of claim 18 wherein said third detector means comprises means for developing counting signals representative of the difference between the values of said peak-level signal and of one of said first and second predetermined values, and means for applying said counting signals to said digital counting means to change the count stored therein in accordance with said difference.

* * * * *

UNITED STATES PATENT AND TRADEMARK OFFICE
CERTIFICATE OF CORRECTION

PATENT NO. : 4,538,178

DATED : Aug. 27, 1985

INVENTOR(S) : T.V. Bolger

It is certified that error appears in the above-identified patent and that said Letters Patent is hereby corrected as shown below:

| | |
|---|---|
| Column 6, line 3 | that portion reading "30" should be deleted. |
| Column 8, Claim 8, line 22 | "fiist" should be --first--. |
| Column 8, Claim 10, line 43 | "signais" should be --signals--. |
| Column 8, Claim 10, line 45 | "repres enta-" should be --representa- --. |
| Column 9, Claim 12, line 14 | "value" should be --values--. |

Signed and Sealed this

Twenty-eighth Day of January 1986

[SEAL]

Attest:

DONALD J. QUIGG

Attesting Officer

Commissioner of Patents and Trademarks